United States Patent
Lee

(10) Patent No.: US 10,857,882 B2
(45) Date of Patent: Dec. 8, 2020

(54) SYSTEM AND METHOD FOR REMOTELY CONTROLLING AND MONITORING VEHICLE BASED ON IOT

(71) Applicant: GARIN SYSTEM Co.,Ltd., Incheon (KR)

(72) Inventor: Yun Sub Lee, Incheon (KR)

(73) Assignee: GARIN SYSTEM CO., LTD., Incheon (KR)

( * ) Notice: Subject to any disclaimer, the term of this patent is extended or adjusted under 35 U.S.C. 154(b) by 201 days.

(21) Appl. No.: 15/893,905

(22) Filed: Feb. 12, 2018

(65) Prior Publication Data
US 2018/0244152 A1    Aug. 30, 2018

(30) Foreign Application Priority Data
Feb. 28, 2017  (KR) .................. 10-2017-0026290

(51) Int. Cl.
| | |
|---|---|
| B60Q 1/00 | (2006.01) |
| G07C 9/00 | (2020.01) |
| G07C 5/00 | (2006.01) |
| G07C 5/08 | (2006.01) |
| B60K 31/00 | (2006.01) |
| B60R 25/06 | (2006.01) |
| G07C 5/02 | (2006.01) |
| B60H 1/00 | (2006.01) |
| H04L 12/40 | (2006.01) |
| H04L 29/08 | (2006.01) |

(52) U.S. Cl.
CPC ..... *B60K 31/0058* (2013.01); *B60H 1/00657* (2013.01); *B60R 25/06* (2013.01); *G07C 5/008* (2013.01); *G07C 5/02* (2013.01); *B60Y 2300/192* (2013.01); *G07C 5/085* (2013.01); *H04L 67/12* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

| | | | |
|---|---|---|---|
| 7,688,178 B2 * | 3/2010 | Koike .................. | B60R 25/04 340/10.5 |
| 9,017,216 B1 * | 4/2015 | Holub .................. | B60W 10/11 477/94 |

(Continued)

*Primary Examiner* — Adam D Tissot
(74) *Attorney, Agent, or Firm* — Patent Office of Dr. Chung Park

(57) ABSTRACT

Disclosed are a system and method for remotely controlling and monitoring a vehicle based on the IoT. A system for remotely controlling and monitoring a vehicle based on an IoT includes a communication unit configured to receive a remote control signal and an event signal and transmit monitoring information, a gear mode sensing unit configured to sense a gear mode, a control unit configured to generate a start-up control signal for a vehicle in response to the remote control signal or the event signal, output or stop a start-up control signal in response to a gear mode, output a monitoring signal when start-up is performed, perform transmission control through the communication unit by generating the monitoring information, generate and output an associated vehicle control signal in response to an event, and a start-up device configured to be turned on in response to the start-up control signal.

4 Claims, 6 Drawing Sheets

(56) References Cited

U.S. PATENT DOCUMENTS

| | | | | |
|---|---|---|---|---|
| 2013/0211623 A1* | 8/2013 | Thompson | ............. | B60L 1/003 |
| | | | | 701/2 |
| 2014/0379174 A1* | 12/2014 | Holub | ................. | G01R 31/382 |
| | | | | 701/2 |

* cited by examiner

SYSTEM AND METHOD FOR REMOTELY CONTROLLING AND MONITORING VEHICLE BASED ON IOT

CROSS REFERENCE TO RELATED APPLICATION

The present application claims the benefit of Korean Patent Application No. 10-2017-0026290 filed in the Korean Intellectual Property Office on Feb. 28, 2017, the entire contents of which are incorporated herein by reference.

BACKGROUND OF THE INVENTION

1. Technical Field

The present invention relates to a technology for remotely controlling and monitoring a vehicle and, more particularly, to a system and method for remotely controlling and monitoring a vehicle based on the IoT, which enhance monitoring and remote control in a vehicle driving stop state.

2. Description of the Related Art

The Internet of Things (hereinafter referred to as the "IoT") is a computing system in which several technologies for connecting various devices based on the wireless Internet, obtaining environmental information through sensors, and performing control based on the obtained environmental information have been converged.

In such an IoT environment, an app can provide useful information and convenience to a user using several devices or apparatuses connected to a network. IoT devices may provide simple information or provide service according to the cooperation of a plurality of devices.

In this case, then IoT device that denotes the thing may include various embedded systems, such as home appliances, mobile equipment, computers and vehicles. Each thing includes an identification factor capable of identifying itself and a function capable of processing a communication function and data.

In an example in which an IoT device is applied to a vehicle, the remote control and monitoring of a vehicle can be performed through the IoT device. This is related to a vehicle driving function and can also provide various convenience functions and high-quality functions upon parking/stop. To this end, a plurality of sensor for sensing a vehicle state is disposed. In general, controller area network (CAN) communication is used as a method for the plurality of sensors to efficiently perform communication. In CAN communication, fixed identifiers are assigned to messages transmitted between devices, and the messages are transmitted/received according to message transmission priority.

In this remote control and monitoring system, pieces of information collected by the sensors are transmitted to a server in real time while operating in conjunction with transmission/reception equipment included in a vehicle through WCDMA. The server stores data related to vehicle driving, such as mileage and fuel efficiency, and provides the data to a user terminal (e.g., smartphone) in response to a request from a user.

However, the remote control and monitoring system has a limit in that it is limited to a simple function for remotely turning on a vehicle or monitoring the mileage or fuel efficiency of a vehicle. In particular, the system has a limit in that monitoring is limited to some devices when the vehicle is parked or stopped, that is, the state in which the vehicle has stopped. For example, monitoring depends on a black box installed on the vehicle because major sensors have been turned off in the parking or stop state in which the vehicle has stopped. Accordingly, real-time monitoring is limited to the parking or stop state of the vehicle.

SUMMARY OF THE INVENTION

Accordingly, the present invention has been made keeping in mind the above problems occurring in the prior art, and an object of the present invention is to provide a system and method for remotely controlling and monitoring a vehicle based on the IoT, which can enhance monitoring and remote control in the vehicle turn-off state through a system integration type convergence/complex technology in which independent controllers are integrated into a single controller and functions are united into a single app.

A system for remotely controlling and monitoring a vehicle based on an IoT according to an embodiment of the present invention includes a communication unit configured to receive a remote control signal and an event signal and transmit monitoring information, a gear mode sensing unit configured to sense a gear mode, a control unit configured to generate a start-up control signal for a vehicle in response to the remote control signal or the event signal, output or stop a start-up control signal in response to a gear mode, output a monitoring signal when start-up is performed, perform transmission control through the communication unit by generating the monitoring information, generate and output an associated vehicle control signal in response to an event, and a start-up device configured to be turned on in response to the start-up control signal.

In this case, the control unit further may include a device group controlled in response to the vehicle control signal, and the device group may include an air conditioner, a door device and a gear device.

Furthermore, the control unit may include an event determination unit configured to determine the type of event in response to the event signal, a notification unit configured to notify a user terminal or a server of the type of event, a start-up unit configured to perform start-up in accordance with the type of event, and a gear locking unit configured to lock a gear in accordance with the type of event and release locking in response to key insertion and key recognition for the start-up unit.

A method of remotely controlling and monitoring a vehicle based on the IoT according to an embodiment of the present invention includes determining whether an event has occurred or not in a state in which a driving of a vehicle has stopped, generating a vehicle control signal in response to a type of event when the event occurs, and performing control corresponding to the vehicle control signal and releasing the event.

The event may include a door open signal and a battery discharge signal, the vehicle control signal may include a start-up signal and a gear locking signal, and the release of the event may be performed by key insertion or key recognition.

DETAILED DESCRIPTION

Figure 1:
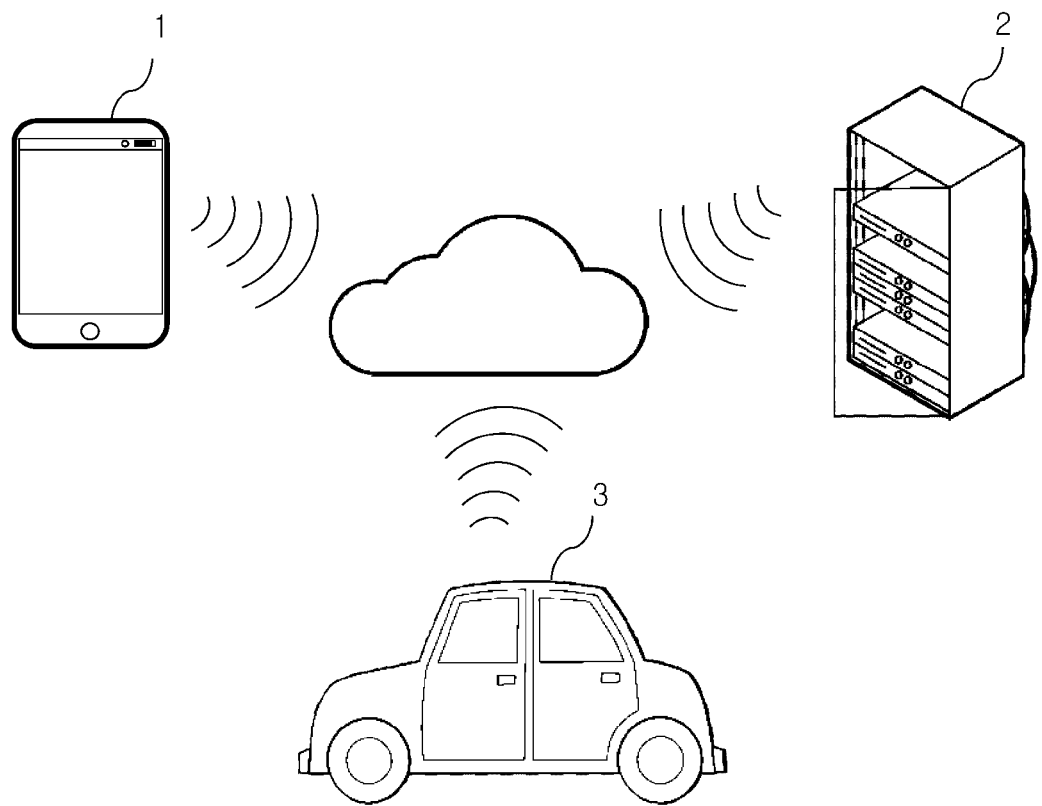
FIG. 1 shows a conceptual diagram of an overall system for remotely controlling and monitoring a vehicle based on the IoT according to an embodiment of the present invention.

Hereinafter, embodiments of the present invention are described in detail with reference to the accompanying drawings, but it is presupposed that the same reference numerals denote the same elements.

In the detailed description or claims of the invention, when it is said that one element "includes" the other element, the word "include" should not be construed as including only the corresponding element, unless explicitly described to the contrary, but should be construed as further including other elements.

Furthermore, in the detailed description or claims of the invention, an element named "~means", "~unit", "~module" or "~block" means a unit for processing at least one function or operation, and each one may be implemented by software, hardware or a combination of them.

An embodiment of the present invention relates to a system which performs remote control, a tachograph and a self-diagnosis function used in a vehicle and enables vehicle control and the acquisition of information about the vehicle to be managed more easily and conveniently through a user terminal (e.g., a smartphone or a tablet) based on the IoT-based remote communication technology. Furthermore, an embodiment of the present invention relates to a system integration type convergence/complex technology in which independent controllers are integrated into a single controller (RDD-CTR) and functions are also united into a single app (RDD-App). More specifically, in remote control, such as vehicle start-up, air-conditioning control and door control, a short/remote distance communication module is mounted on an integrated controller (or control unit) so that control is made possible through Bluetooth communication in a short distance and control is made possible through WCDMA communication in a remote distance, and a vehicle is diagnosed, recorded and managed using the on board diagnostic (OBD2) function of the B-CAN and C-CAN of a vehicle CAN system. Furthermore, the system is configured so that pieces of collected information are provided to a user in real time using a Bluetooth communication module and pieces of collected air-conditioning information and vehicle driving information can be checked even in a remote distance through WCDMA communication.

Required data messages are extracted from messages transmitted and received between devices over a network controller area network (CAN) using a CAN system mounted on a vehicle. Furthermore, the extracted data messages are classified into messages capable of vehicle control and various pieces of information capable of diagnosing the state of the vehicle. That is, devices mounted on the vehicle use unique data messages depending on their locations and use. There is proposed the control unit mounted on the vehicle based on a database in which the messages have been classified into groups, for example, data messages that perform control of an air conditioner and control of the lock/unlock of a door and the turn-on/off of an emergency light in the vehicle, state messages capable of checking the state of an engine and whether a door has been open or closed, and data messages, including answers to required questions such as the current fuel state, speed and the time during which the engine has been on, for each data message. Furthermore, machine to machine (M2M) is used to connect the control unit and a user terminal, that is, an external device. An IoT-based system for checking a problem in the vehicle by diagnosing remote control of the vehicle and a vehicle state using the user terminal in real time is implemented.

An embodiment of the present invention discloses a system regarding remote control and monitoring.

Examples in which a system and method for remotely controlling and monitoring a vehicle based on the IoT according to embodiments of the present invention have been implemented are described in connection with specific embodiments.

FIG. 1 shows a conceptual diagram of an overall system for remotely controlling and monitoring a vehicle based on the IoT according to an embodiment of the present invention.

Referring to FIG. 1, the system according to an embodiment of the present invention includes a user terminal 1 (e.g., smartphone) configured to perform remote control and receive monitoring information, a server 2 configured to receive and store monitoring information and vehicle driving information and provide the user terminal 1 with the monitoring information and vehicle driving information, and a vehicle 3 subjected to remote control by the user terminal 1, configured to provide monitoring information and vehicle driving information to at least one of the server 2 and the user terminal 1 and automatically controlled in response to an event in a parking or stop state.

The system configured as described above may perform various types of automatic control, including start-up control and air-conditioning control, in response to an event, and may perform vehicle control associated with an event in response to automatic control.

Figure 2:
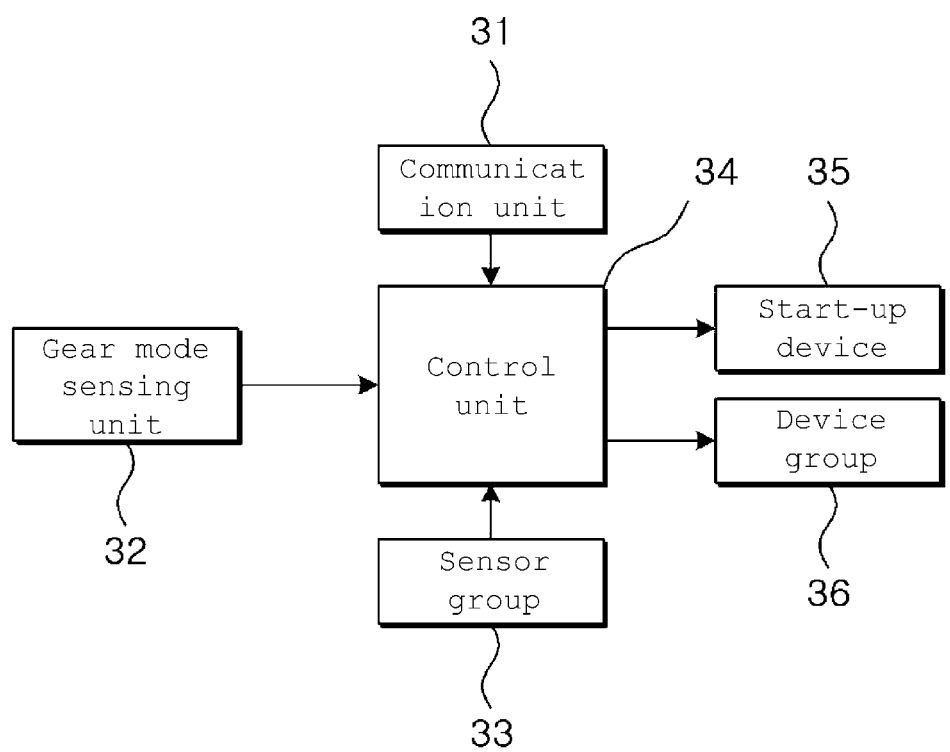
FIG. 2 shows the configuration of a system for remotely controlling and monitoring a vehicle based on the IoT according to an embodiment of the present invention.

FIG. 2 shows the configuration of a system for remotely controlling and monitoring a vehicle based on the IoT according to an embodiment of the present invention.

Referring to FIG. 2, the system for remotely controlling and monitoring a vehicle based on the IoT according to an embodiment of the present invention includes a communication unit 31 configured to receive a remote control signal and an event signal and transmit monitoring information, a gear mode sensing unit 32 configured to sense a gear mode and include a temperature sensor, a humidity sensor, and so on, a sensor group 33 configured to generate environmental information, and a control unit 34 configured to generate a start-up control signal for the vehicle 3 in response to a remote control signal or an event signal, output or stop a start-up control signal in response to a gear mode, output a monitoring signal when start-up is performed, perform transmission control through the communication unit 31 by generating monitoring information, generate and output an associated vehicle control signal in response to an event, a start-up device 35 configured to be turned on in response to a start-up control signal, and a device group 36 controlled in response to a vehicle control signal.

In this case, the device group comprises an air conditioner, a door device, and a gear device.

The air-conditioning control system for a vehicle configured as described above according to an embodiment of the present invention performs air-conditioning control based on environmental information generated by the sensor group 33 in response to remote start-up from the user terminal 1 or by an event, or may perform associated vehicle control in response to an event. In this case, the vehicle control may include air-conditioning control and associated gear locking control in response to an event.

Figure 3:
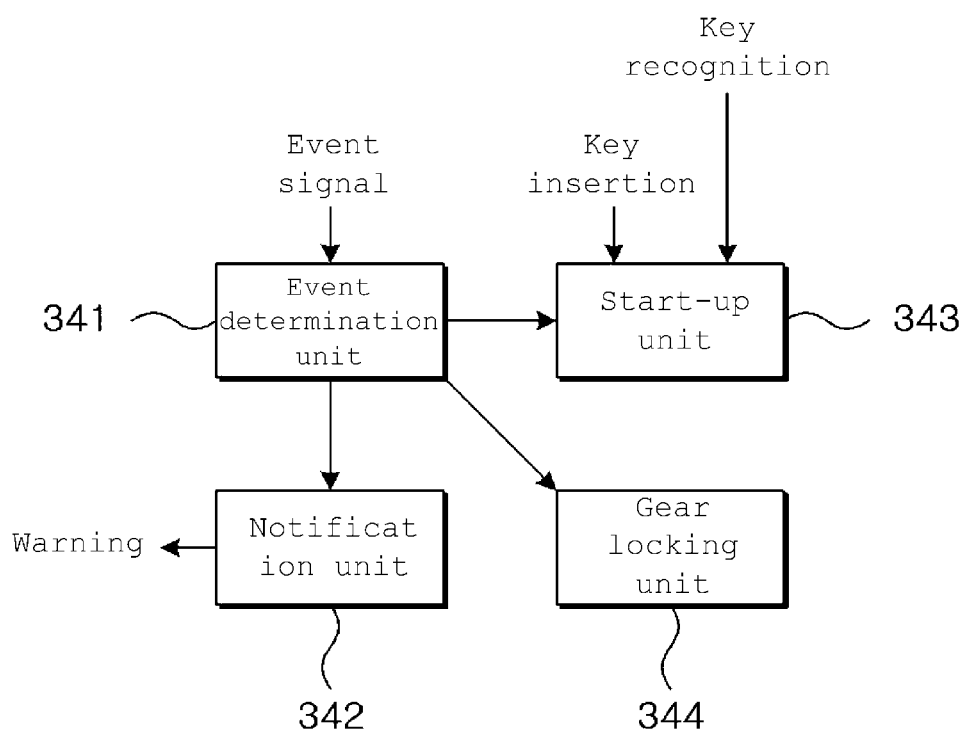
FIG. 3 shows the configuration of a control unit according to an embodiment of the present invention.

FIG. 3 shows the configuration of a control unit according to an embodiment of the present invention.

Referring to FIG. 3, the control unit 34 according to an embodiment of the present invention includes an event determination unit 341 configured to determine the type of event in response to an event signal, a notification unit 342 configured to notify the user terminal 1 or the server 2 of the type of event, a start-up unit 343 configured to perform start-up in accordance with the type of event, and a gear locking unit 344 configured to lock a gear in accordance with the type of event and release locking in response to key insertion and key recognition for the start-up unit 343.

The control unit 34 according to an embodiment of the present invention performs vehicle control connected to a corresponding event in response to the type of event, and locks a gear when vehicle start-up corresponding to an event is performed. In this case, if key insertion and key recognition are performed in the state in which the gear has been locked, the control unit releases the locking of the gear.

A method of remotely controlling and monitoring a vehicle based on the IoT using the system configured as described above according to an embodiment of the present invention is described below.

Figure 4:
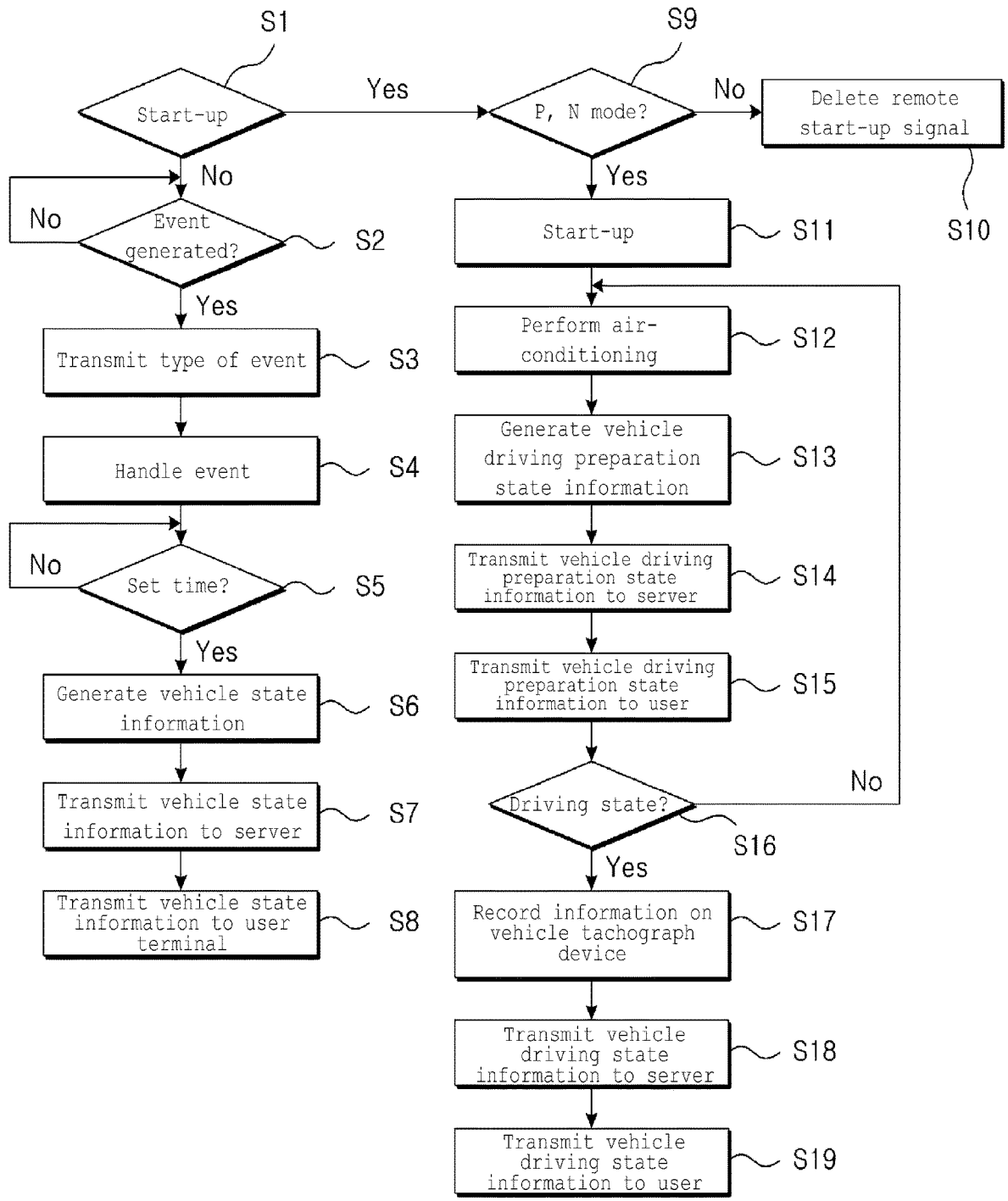
FIG. 4 is a flowchart of a method of remotely controlling and monitoring a vehicle based on the IoT according to an embodiment of the present invention.

FIG. 4 is a flowchart of a method of remotely controlling and monitoring a vehicle based on the IoT according to an embodiment of the present invention.

Referring to FIG. 4, first, whether a remote start-up signal according to remote control of the user terminal 1 is generated is determined (S1).

If, as a result of the determination, the remote start-up signal is not generated, whether an event signal is generated is determined (S2).

If, as a result of the determination, the event signal is generated, the type of event signal is transmitted to the server 2 or the user terminal 1 (S3). In this case, the type of event signal may include door opening or battery voltage discharge.

There may be a response from a user in response to the event signal. Alternatively, there may be remote control corresponding to the type of event using the user terminal 1 (S4).

The control unit 34 determines whether a preset time has been reached (S5). If, as a result of the determination, the prescribed time has been reached, the control unit transmits vehicle state information collected so far to the server 2 (S6~S7). The server 2 receives and stores the vehicle state information.

Furthermore, the server 2 transmits the vehicle state information to the user terminal 1 (S8).

If, as a result of the determination at step S1, the remote start-up signal is generated, whether a gear is a parking (P) mode or a neutral (N) mode state is checked (S9).

If, as a result of the determination, the gear is not the parking mode or the neutral mode, the remote start-up signal is deleted (S10). That is, the remote start-up signal is forcedly terminated and the current state is maintained.

If, as a result of the determination, the gear is the parking mode or the neutral mode, the start-up of the vehicle 3 is performed (S11).

Preset control, for example, air-conditioning control may be performed along with the start-up (S12).

The control unit 34 generates vehicle driving preparation state information related to preheating, such as a temperature within a vehicle and oil, and transmits the vehicle driving preparation state information to the server 2 (S13~S14). The server 2 receives and stores the vehicle preparation state information.

Furthermore, the server 2 transmits the vehicle preparation state information to the user terminal 1 (S15).

If the gear is the driving mode (S16), the server records vehicle driving state information, such as a speed, a distance, steering and a brake, on a vehicle tachograph device (S17).

The control unit 34 of the vehicle tachograph device transmits the vehicle driving state information to the server 2 (S18).

The server 2 transmits the vehicle driving state information to the user terminal 1 (S19).

As described above, in an embodiment of the present invention, management prior to start-up and management after start-up are separately managed.

However, management prior to start-up is insufficient.

An embodiment of the present invention proposes a system having enhanced monitoring prior to start-up, that is, in the state in which the driving of the vehicle has stopped.

That is, as described above, whether a door has opened or whether a battery voltage has been discharged is transmitted to the user terminal 1, so a user can take measures through the user terminal 1.

By way of example, when a door is open due to a mistake or robbery, a door open warning signal is generated and transmitted to the server 2 or the user terminal 1.

In response to the door open warning signal, a user can perform remote close control through the user terminal 1 or report this fact.

Figure 5:
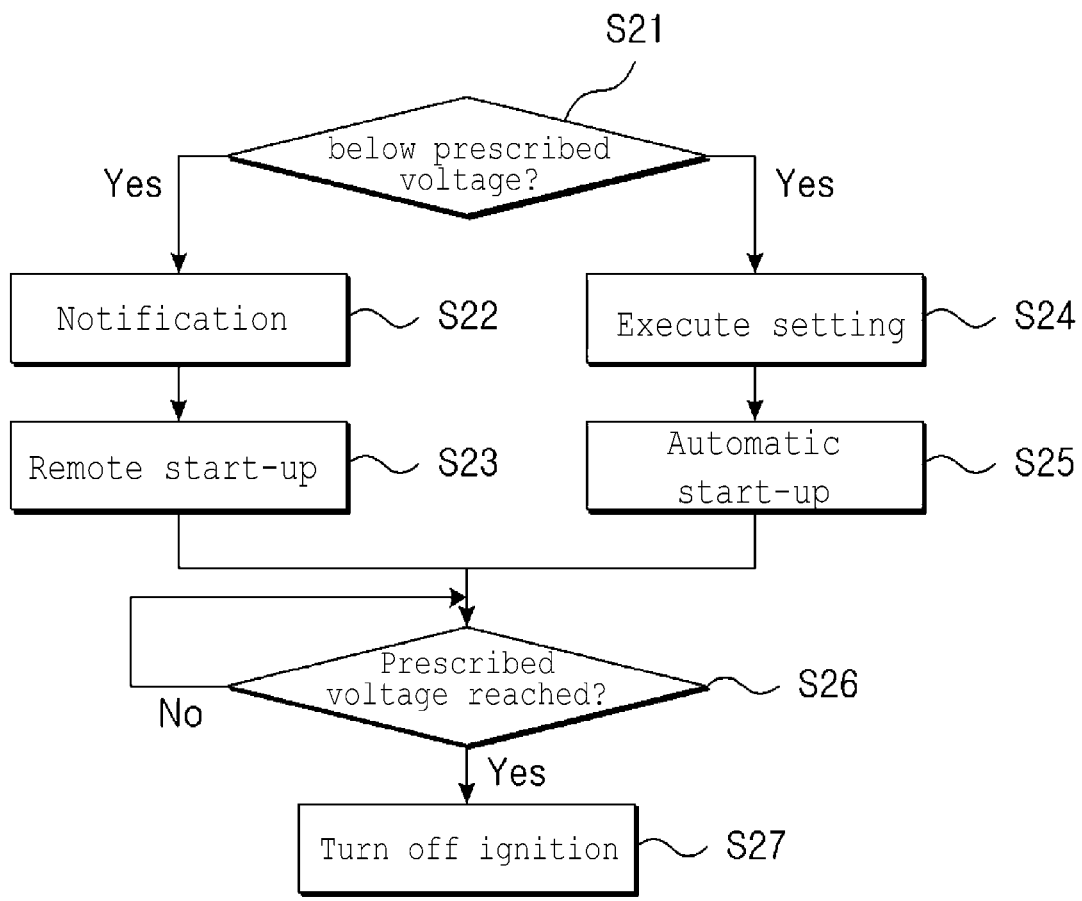
FIG. 5 is a flowchart of control of an event according to an embodiment of the present invention.

FIG. 5 is a flowchart of control of an event according to an embodiment of the present invention.

Referring to FIG. 5, for another example, if, as a result of the check of a battery voltage, the battery voltage is below a prescribed voltage (S21), a battery voltage warning signal may be generated and transmitted to the user terminal 1 of a user, so remote start-up may be performed through the user terminal 1 (S22~S23) or automatic start-up may be performed according to setting (S24~S25).

Accordingly, the battery is charged by remote start-up or automatic start-up. In this case, the start-up may be performed only when the gear is the parking mode or the neutral mode state, and thus the battery can be charged.

When the battery voltage reaches the prescribed voltage (S26), the ignition is automatically turned off (S27).

Figure 6:
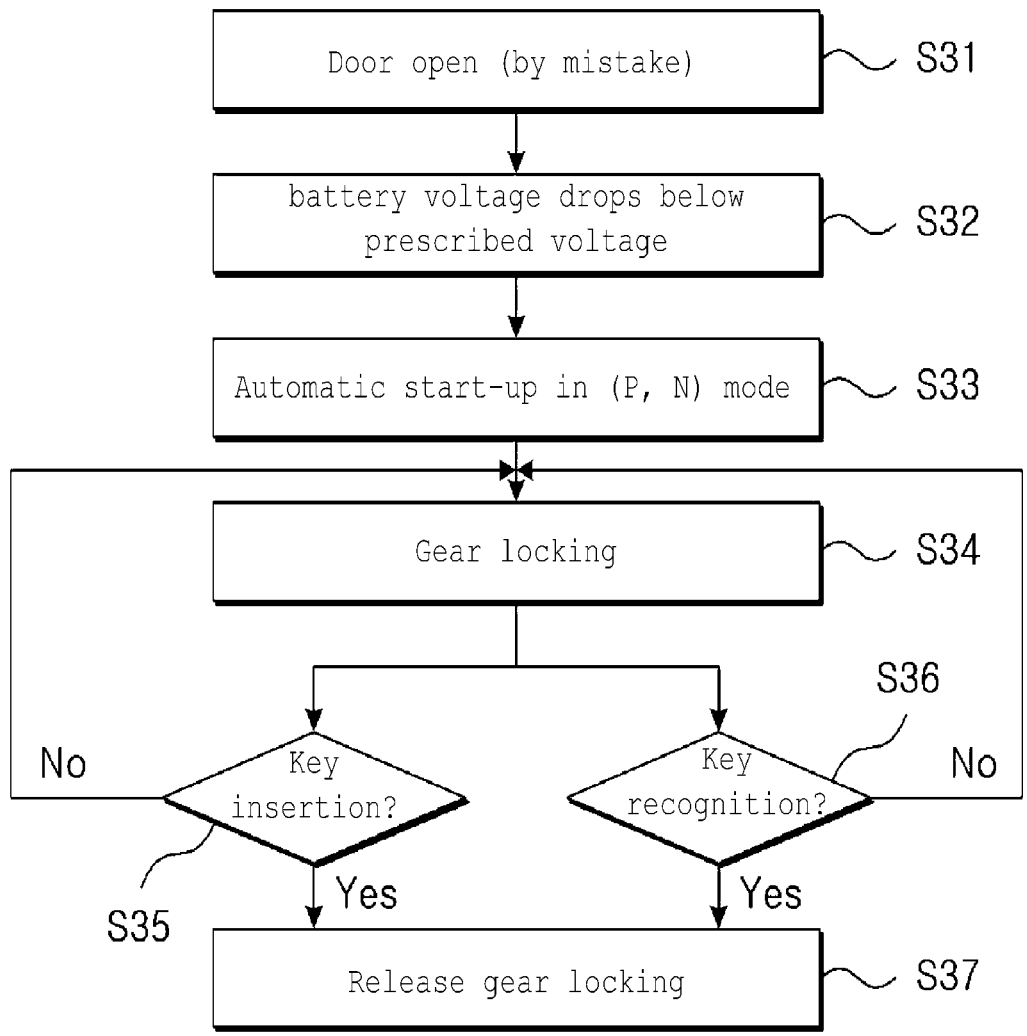
FIG. 6 is a flowchart of control corresponding to an event according to an embodiment of the present invention.

FIG. 6 is a flowchart of control corresponding to an event according to an embodiment of the present invention.

Referring to FIG. 6, if a battery voltage is a prescribed voltage or less (S32) in the state in which a door open state continues due to a user's mistake (S31), when the gear is the parking (P) mode or the neutral (N) mode, start-up is automatically performed by an algorithm (S33).

In this case, there is the possibility of robbery because vehicle driving may be made possible by a person around the vehicle.

Accordingly, in an embodiment of the present invention, a gear locking state is maintained so that the gear cannot be manipulated (S34).

In this case, if key insertion is performed (S35) or a smart key is recognized (S36), the gear locking state is released (S37). That is, the vehicle driving state is made possible by a user's control.

As described above, in accordance with the system and method for remotely controlling and monitoring a vehicle based on the IoT according to the embodiments of the present invention, real-time monitoring and remote control can be efficiently performed even in the parking or top state of a vehicle.

The technical spirit of the present invention has been described through some embodiments described above.

It is evident that a person having ordinary skill in the art to which the present invention pertains may modify or change the aforementioned embodiments in various ways from the writing of the present invention. Furthermore, although it is not explicitly shown or described, it is evident that a person having ordinary skill in the art to which the present invention pertains may modify the present invention in various forms including the technical spirit of the present invention from the writing of the present invention, which belongs to the scope of right of the present invention. The embodiments described with reference to the accompanying drawings have been described to describe the present invention, and the scope of right of the present invention is not limited to such embodiments.

What is claimed is:

1. A system for remotely controlling and monitoring a vehicle based on an IoT, the system comprising:
    a communication unit configured to receive an event signal that includes a battery discharge signal and a door open signal, the battery discharge signal and door open signal being generated while an engine of the vehicle is turned off, and transmit monitoring information that is generated while the engine is turned on;
    a gear mode sensing unit configured to sense a gear mode;
    a control unit configured to generate a start-up control signal for the vehicle in response to the event signal, output or stop the start-up control signal in response to the gear mode, output a monitoring signal when start-up of the vehicle is performed, perform transmission control through the communication unit by generating the monitoring information, generate and output a vehicle control signal in response to an event; and
    a start-up device configured to be turned on in response to the start-up control signal,
    wherein the control unit includes a gear locking unit that controls locking a gear and wherein the control unit is configured to:
        generate, in response to the event signal, the start-up control signal and output the start-up control signal to the start-up device only when the gear mode is a parking mode or a neutral mode;
        when the start-up device starts the vehicle, generate a gear locking signal and output the gear locking signal to the gear locking unit to lock the gear; and
        release locking the gear in response to key insertion and key recognition.

2. The system of claim 1, wherein:
    the control unit further comprises a device group controlled in response to the vehicle control signal, and
    the device group comprises an air conditioner, a door device and a gear device.

3. The system of claim 1, wherein the control unit comprises:
    an event determination unit configured to determine a type of event in response to the event signal;
    a notification unit configured to notify a user terminal or a server of the type of event; and
    a start-up unit configured to drive the start-up device;
    wherein the gear locking unit is configured to lock the gear in accordance with the type of event and release locking in response to the key insertion and the key recognition.

4. A method of remotely controlling and monitoring a vehicle using the system of claim 1, comprising:
    responsive to receiving an event signal that includes a battery discharge signal and a door open signal, generating a start-up control signal of the vehicle, wherein the battery discharge signal and door open signal are generated while an engine of the vehicle is turned off;
    determining a gear mode and outputting the start-up control signal to a start-up device only when the determined gear mode is a parking mode or a neutral mode;
    when the vehicle is started, outputting a gear locking signal to a gear locking unit to lock a gear; and
    releasing locking the gear in response to key insertion and key recognition.

* * * * *